United States Patent
Jung et al.

(10) Patent No.: US 9,813,735 B2
(45) Date of Patent: Nov. 7, 2017

(54) METHOD FOR ENCODING A CURRENT BLOCK OF A FIRST IMAGE COMPONENT RELATIVE TO A REFERENCE BLOCK OF AT LEAST ONE SECOND IMAGE COMPONENT, ENCODING DEVICE AND CORRESPONDING COMPUTER PROGRAM

(71) Applicant: Orange, Paris (FR)

(72) Inventors: Joel Jung, Le Mesnil Saint Denis (FR); Kartik Viswanathan, Rennes (FR)

(73) Assignee: ORANGE, Paris (FR)

( * ) Notice: Subject to any disclaimer, the term of this patent is extended or adjusted under 35 U.S.C. 154(b) by 148 days.

(21) Appl. No.: 14/410,947

(22) PCT Filed: Jun. 25, 2013

(86) PCT No.: PCT/FR2013/051474
§ 371 (c)(1),
(2) Date: Dec. 23, 2014

(87) PCT Pub. No.: WO2014/001703
PCT Pub. Date: Jan. 3, 2014

(65) Prior Publication Data
US 2015/0181231 A1    Jun. 25, 2015

(30) Foreign Application Priority Data

Jun. 27, 2012    (FR) ..................... 12 56129

(51) Int. Cl.
*H04N 19/597*    (2014.01)
*H04N 19/176*    (2014.01)
(Continued)

(52) U.S. Cl.
CPC ......... *H04N 19/597* (2014.11); *H04N 19/119* (2014.11); *H04N 19/142* (2014.11);
(Continued)

(58) Field of Classification Search
CPC .. H04N 19/597; H04N 19/119; H04N 19/142; H04N 19/147; H04N 19/176; H04N 19/192; H04N 19/46; H04N 19/463
See application file for complete search history.

(56) References Cited

U.S. PATENT DOCUMENTS

| | | |
|---|---|---|
| 5,351,095 A | 9/1994 | Kerdranvat |
| 7,499,492 B1 | 3/2009 | Ameres et al. |

(Continued)

FOREIGN PATENT DOCUMENTS

| | | |
|---|---|---|
| WO | 2011046607 A2 | 4/2011 |
| WO | 2011061089 | 5/2011 |
| WO | 2011127966 A1 | 10/2011 |

OTHER PUBLICATIONS

International Search Report dated Sep. 23, 2014 for corresponding International Application No. PCT/FR2013/051474, filed Jun. 25, 2013.

(Continued)

*Primary Examiner* — Md Haque
(74) *Attorney, Agent, or Firm* — David D. Brush; Westman, Champlin & Koehler, P.A.

(57) ABSTRACT

A method for coding a current block of a first image component with respect to a reference block of at least one second image component. The first and second image components are representative of the same scene, and the reference block being previously subjected to coding by partitioning, and then to decoding. Partitioning of the reference block is performed a plurality of times until a determined level of depth of partitioning is obtained. The coding method includes, as a function of the type of the first and second image components: partitioning the current block a plurality of times until a level of depth of partitioning dependent on the level of partitioning of the reference block is obtained; or partitioning the current block on the basis of a level of (Continued)

depth of partitioning previously initialized by a level of partitioning depending on the level of partitioning for the reference block.

6 Claims, 7 Drawing Sheets

(51) Int. Cl.
    *H04N 19/192*     (2014.01)
    *H04N 19/119*     (2014.01)
    *H04N 19/142*     (2014.01)
    *H04N 19/463*     (2014.01)
    *H04N 19/147*     (2014.01)
    *H04N 19/46*     (2014.01)

(52) U.S. Cl.
    CPC ......... *H04N 19/176* (2014.11); *H04N 19/192* (2014.11); *H04N 19/463* (2014.11); *H04N 19/147* (2014.11); *H04N 19/46* (2014.11)

(56) References Cited

U.S. PATENT DOCUMENTS

2011/0188572 A1* 8/2011 Min .................... H04N 19/105
    375/240.12

2013/0034171 A1* 2/2013 Winken ............... H04N 19/597
    375/240.25

OTHER PUBLICATIONS

B. Bross, W.-J. Han, J.-R. Ohm, G. J. Sullivan, and T. Wiegand, "High efficiency video coding (HEVC) text specification draft 6," document JCTVC-H1003 of JCT-VC, San Jose CA, USA, Feb. 2012.

Bross et al., "High efficiency video coding (HEVC) text specification draft 6," document JCTVC-H1003 of JCT-VC, San Jose CA, USA, Feb. 2012.

Chia-Yuan Teng et al., "A New Quadtree Predictive Image Coder," Proceedings of the International Conference on Image Processing (ICIP). Washington, Oct. 23-26, 1995; [Proceedings of the International Conference on Image Processing. (ICIP)], Los Alamitos, IEEE Comp. Soc. Press, US, vol. 2, Oct. 23, 1995 (Oct. 23, 1995), pp. 73-76, XP010196975.

Merkle P. et al., "The effects of Multiview Depth Video Compression on Multiview Rendering", Signal Processing Image Communication, Elsevier Science Publishers, Amsterdam, NL, vol. 24, No. 1-2, Jan. 1, 2009 (Jan. 1, 2009), pp. 73-88, XP025884346.

English translation of the Written Opinion of the International Searching Authority, dated Dec. 27, 2014 for corresponding International Application No. PCT/FR2013/051474, filed Jun. 25, 2013.

* cited by examiner

METHOD FOR ENCODING A CURRENT BLOCK OF A FIRST IMAGE COMPONENT RELATIVE TO A REFERENCE BLOCK OF AT LEAST ONE SECOND IMAGE COMPONENT, ENCODING DEVICE AND CORRESPONDING COMPUTER PROGRAM

CROSS-REFERENCE TO RELATES APPLICATIONS

This application is a Section 371 National Stage application of International Application No. PCT/FR2013/051474, filed Jun. 25, 2013, which is incorporated by reference in its entirety and published as WO 2014/001703 on Jan. 3, 2014, not in English.

FIELD OF THE INVENTION

The present invention pertains generally to the field of image processing, and more precisely to the coding of digital images and of sequences of digital images.

The invention can thus in particular be applied to the video coding implemented in current video coders in future (ITU-T/ISO MPEG HEVC) and their extensions.

BACKGROUND OF THE INVENTION

Figure 1A:
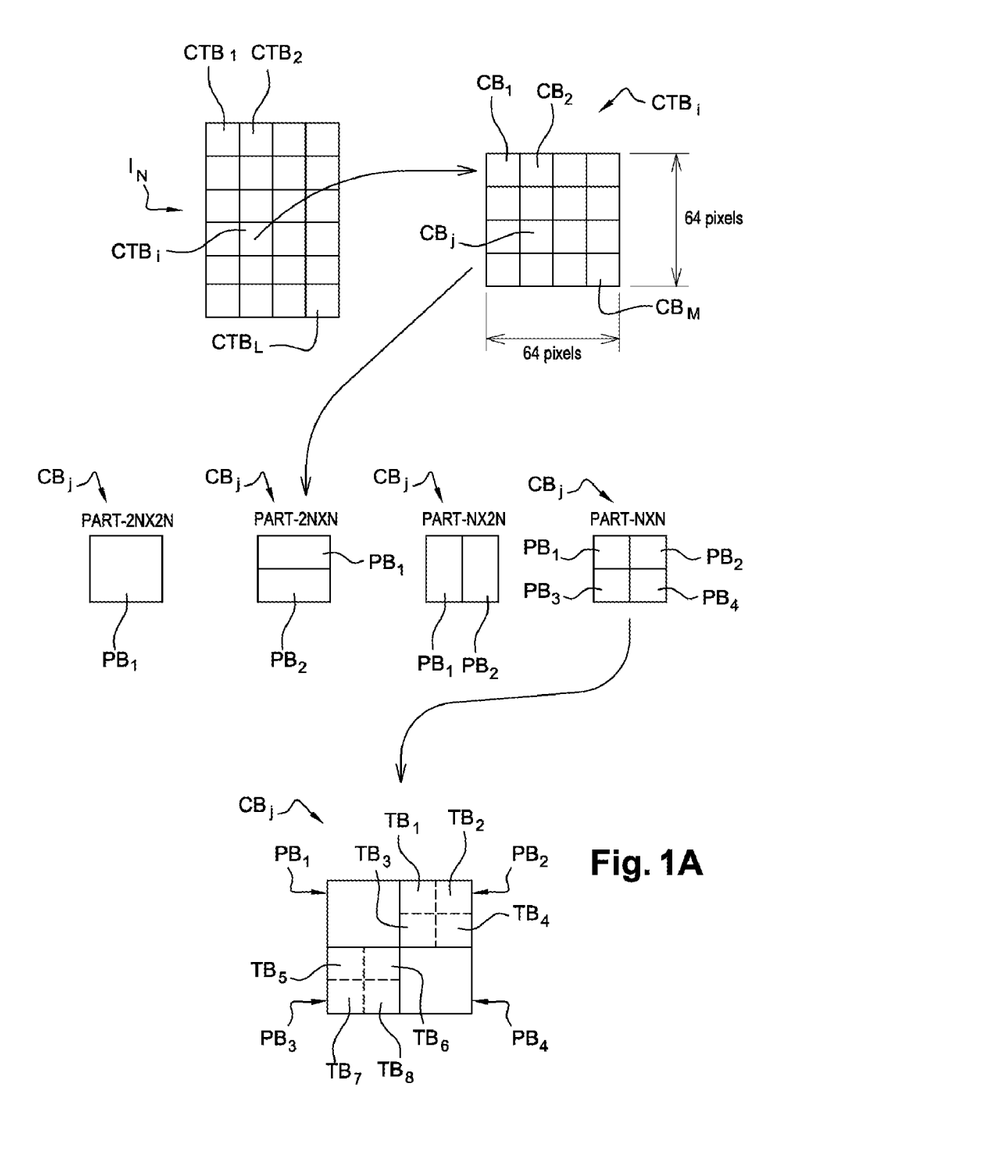
FIG. 1A shows the successive operations of partitioning a block in accordance with HEVC technology.

The HEVC standard currently being drafted and described in the document "B. Bross, W.-J. Han, J.-R. Ohm, G. J. Sullivan, and T. Wiegand, "High efficiency video coding (HEVC) text specification draft 6," document JCTVC-H1003 of JCT-VC, San Jose Calif., USA, February 2012" is similar to the previous H.264 standard, in the sense that it uses block partitioning of the video sequence. The HEVC standard is, however, distinguished from the H.264 standard by the fact that the partitioning implemented complies with a tree-like structure called "quadtree". For this purpose, as shown in FIG. 1A, a current image $I_N$ is partitioned a first time into a plurality of square blocks $CTB_1, CTB_2, \ldots, CTB_i, \ldots, CTB_T$ of size 64×64 pixels (1≤i≤L). For a given block $CTB_i$, this block is considered to constitute the root of a coding tree in which:
- a first level of leaves under the root corresponds to a first level of partitioning depth for the block $CTB_i$ for which the block $CTB_i$ has been partitioned a first time into a plurality of coding blocks,
- a second level of leaves under the first level of leaves corresponds to a second level of partitioning depth for the block $CTB_i$ for which the block $CTB_i$ partitioned a first time is partitioned a second time into a plurality of coding blocks, . . . .
- . . . a kth level of leaves under the k−1th level of leaves which corresponds to a kth level of partitioning depth for the block $CTB_i$ for which the block $CTB_i$ partitioned k−1 times is partitioned one last time into a plurality of coding blocks.

In an HEVC compatible coder, the iteration of the partitioning of the block $CTB_i$ is performed as far as a predetermined level of partitioning depth.

On completion of the aforementioned successive partitionings of the block $CTB_i$, as shown in FIG. 1A, the latter is partitioned in the end into a plurality of coding blocks denoted $CB_1, CB_2, \ldots, CB_j, \ldots, CB_M$ with 1≤j≤M.

The size of said coding blocks can be chosen in an adaptive manner with the aid of partitioning of blocks complying with a tree of "quadtree" type, in which the leaves of said tree respectively represent the coding blocks $CB_1, CB_2, \ldots, CB_j, \ldots, CB_M$ obtained at various levels of partitioning depth.

With reference to FIG. 1A, for a given block $CB_j$, this block is considered to constitute the root of a prediction and transformation tree for said block, for example of discrete cosine transform (DCT) type. The prediction tree for a given block $CB_j$ is representative of the way in which the block $CB_j$ is partitioned into a plurality of blocks $PB_1, PB_2, \ldots, PB_t, \ldots, PB_P$, (1≤t≤P), which are called prediction blocks. For a considered prediction block $PB_t$, prediction parameters, such as for example the mode of coding, the motion vectors, etc., are specified in a prediction unit.

There are various modes of partitioning for a considered coding block $CB_j$. FIG. 1A shows for example the various modes of partitioning of the considered coding block $CB_j$, in the case of an INTER prediction for the latter. There are four of said modes of partitioning:
- the PART_2N×2N mode corresponds to the absence of partitioning of the considered coding block $CB_j$, which thus corresponds to a single prediction block $PB_1$,
- the PART_2N×N mode corresponds to a horizontal partitioning of the considered coding block $CB_j$ into two rectangular prediction blocks $PB_1$ and $PB_2$,
- the PART_N×2N mode corresponds to a vertical partitioning of the considered coding block $CB_j$ into two rectangular prediction blocks $PB_1$ and $PB_2$,
- the PART_N×N mode corresponds to a partitioning of the considered coding block $CB_j$ into four square prediction blocks $PB_1, PB_2, PB_3, PB_4$ which all have the same size.

After predictive coding of the considered coding block $CB_j$, the latter can be partitioned again into a plurality of smaller blocks $TB_1, TB_2, \ldots, TB_v, \ldots, TB_Q$ (1≤v≤Q), which are called transform blocks. Such partitioning complies with a tree of "quadtree" type, called a "residual quadtree", in which the leaves of said tree respectively represent the coding blocks $TB_1, TB_2, \ldots, TB_v, \ldots, TB_Q$ obtained at various levels of partitioning depth.

FIG. 1A shows an exemplary partitioning of the coding block $CB_j$ which has been predicted with the aid of the PART_N×N partitioning. In the example shown, the blocks $PB_2$ and $PB_3$ of the coding block $CB_j$ are for example each partitioned into four smaller square blocks all of the same size, $TB_1, TB_2, TB_3, TB_4$ and $TB_5, TB_6, TB_7, TB_8$, respectively. Such partitioning is represented with dashed lines in FIG. 1A.

Figure 1B:
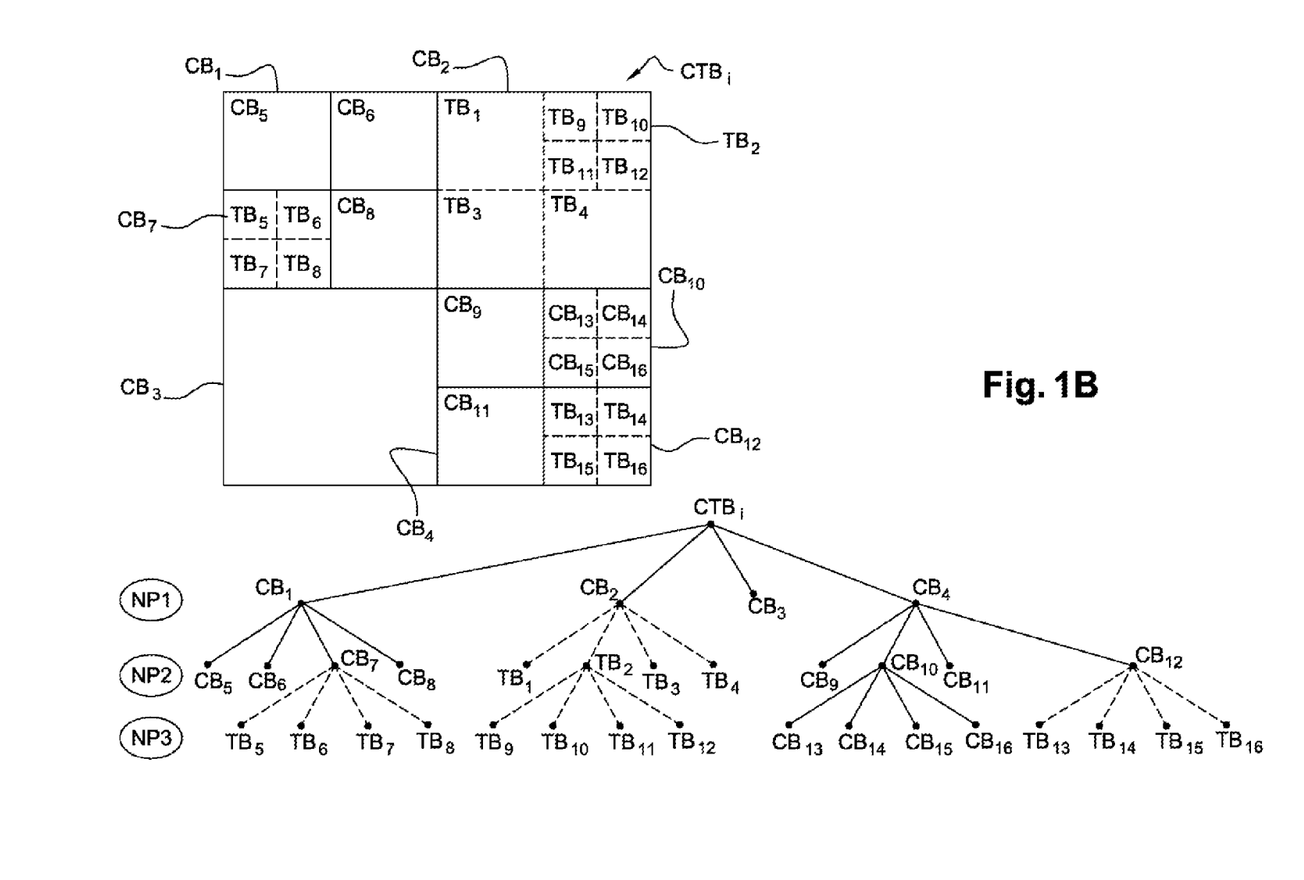
FIG. 1B shows an exemplary partitioning of a coding block which has been obtained after prediction and transformation of said block, as well as the corresponding prediction and transformation tree.

FIG. 1B shows an exemplary partitioning of a considered block $CTB_i$ which has been obtained after predictive coding and transform coding of said block, as well as the corresponding partitioning tree. In the example shown:
- the block $CTB_i$, considered to be the root of the coding tree, is represented with a heavy continuous line,
- the coding blocks $CB_1$ to $CB_{16}$, which constitute on the one hand the leaves of the coding tree and on the other hand the roots of the "residual quadtree" tree, are represented with fine continuous lines,
- the transform blocks $TB_1$ to $TB_{16}$, which constitute the leaves of the "residual quadtree" tree, are represented with dashed lines.

In the tree-like structure constituted in this manner, there is:
- a first level of partitioning depth NP1 which contains solely coding blocks, such as the blocks $CB_1$ to $CB_4$,
- a second level of partitioning depth NP2 which contains: coding blocks, such as the blocks $CB_5$ to $CB_8$ obtained on completion of the partitioning of the block $CB_1$, as well as the blocks $CB_9$ to $CB_{12}$ obtained on completion of the partitioning of the block $CB_4$, transform blocks, such as the blocks $TB_1$ to $TB_4$ obtained on completion of the partitioning of the block $CB_2$, a third level of partitioning depth NP3 which contains:

coding blocks, such as the blocks $CB_{13}$ to $CB_{16}$ obtained on completion of the partitioning of the block $CB_{10}$, transform blocks, such as the blocks $TB_5$ to $TB_8$ obtained on completion of the partitioning of the block $CB_7$, the blocks $TB_9$ to $TB_{12}$ obtained on completion of the partitioning of the block $TB_2$, the blocks $TB_{12}$ to $TB_{16}$ obtained on completion of the partitioning of the block $CB_{12}$.

In an HEVC compatible coder, for a considered block $CTB_i$, several different partitionings of said block are put in competition at the coder, that is to say different respective combinations of partitioning iterations are put in competition, with the aim of selecting the best partitioning, that is to say the partitioning that optimizes the coding of the considered block $CTB_i$ according to a predetermined coding performance criterion, for example the rate/distortion cost or else an efficiency/complexity compromise, which are criteria well known to the person skilled in the art.

Once the optimal partitioning of a considered block $CTB_i$ has been carried out, a digital information sequence, such as for example a string of bits, representative of this optimal partitioning is transmitted in a stream intended to be read by a video decoder.

Such a stream also comprises:

residual data which are the coefficients of the quantized residual block and optionally, when coding in Inter mode, residual data of the motion vectors, coding parameters which are representative of the mode of coding used, in particular:

the mode of prediction (intra prediction, inter prediction, default prediction carrying out a prediction for which no information is transmitted to the decoder, i.e. "skipping"), information specifying the type of prediction (orientation, reference image component, etc.);

the type of transform, for example 4×4 DCT, 8×8 DCT, etc.;

the motion information if necessary;

etc.

More particularly in 3D HEVC technology, it is proposed to code a first image component with respect to at least one second already coded and then decoded image component, said first and second image components being representative of one and the same scene.

The aforementioned first and second image components are for example a texture component and its associated depth component, respectively, as implemented in the new video coding format, called MVD (for "Multiview Video+ Depth"), which is the subject of current developments.

Alternatively, the aforementioned first and second image components could be a depth component and its associated texture component, respectively.

In accordance with 3D HEVC technology, the first and second components are each partitioned into a plurality of blocks which are thereafter partitioned as explained hereinabove. Such partitioning operations turn out to be very expensive in terms of calculations at the coder since they must be performed in their entirety firstly on the second component and then on the first.

SUBJECT AND SUMMARY OF THE INVENTION

One of the aims of the invention is to remedy drawbacks of the aforementioned prior art.

For this purpose, a subject of the present invention relates to a method for coding at least one current block of a first image component with respect to a reference block of at least one second image component, the first and second image components being representative of one and the same scene, the reference block having previously been subjected to coding by partitioning, and then to decoding, the partitioning of the reference block being performed a plurality of times until a determined level of partitioning depth is obtained.

Such a coding method is characterized in that it comprises the steps consisting, as a function of the type of the first and second image components, in:

either partitioning the current block a plurality of times until a level of partitioning depth dependent on the level of partitioning of the reference block is obtained, or partitioning the current block on the basis of a level of partitioning depth having been previously initialized by a level of partitioning depth which depends on the level of partitioning depth for the reference block.

Such a provision thus makes it possible, according to the nature of the first and second image components:

either to halt the successive operations of partitioning of the current block at a level of partitioning depth which is considered to be sufficient since it complies with a predetermined coding performance criterion, such as for example the rate/distortion cost, or to directly partition the current block on the basis of an already established level of partitioning depth which is close to that of the level of partitioning depth for the reference block.

This results in a non-negligible reduction in the complexity of calculations at the coder which is rendered possible by virtue of the fact that the first and second image components represent one and the same scene.

It should be noted that the first and second image components are not image pieces but represent two different views of a complete image representing one and the same scene.

According to one particular embodiment, the step of partitioning the current block, a plurality of times, is implemented when the first image component is a depth image and the second image component is a texture image associated with the depth image, the current block and the reference block having identical positions in the first image component and in the second image component, respectively.

Such a provision allows a reduction in complexity in terms of calculations at the coder when a depth image is coded with respect to a texture image.

According to another particular embodiment, the step of partitioning the current block on the basis of a previously initialized level of partitioning depth is implemented when the first image component is a texture image and the second image component is a depth image associated with the texture image, the current block and the reference block having identical positions in the first image component and in the second image component, respectively.

Such a provision allows a reduction in complexity in terms of calculations at the coder when a texture image is coded with respect to a depth image.

Other types of first and second image components can of course be envisaged.

Thus, the first and second image components can respectively be:
- two views of one and the same multi-view image, said two views representing the same scene either at the same instant or at a different instant, or else
- a luma component and a chroma component, or else
- two different layers during scalable video coding, the current block and the reference block having identical positions in the first image component and in the second image component, respectively.

It is also possible to envisage the coding of a first image component with respect to a second image component and to a third image component. In this case for example:
- the first image component can be a Y component,
- the second image component can be a U component,
- the third image component can be a V component.

The invention also relates to a device for coding at least one current block of a first image component with respect to a reference block of at least one second image component, the first and second image components being representative of one and the same scene, the reference block having previously been subjected to coding by partitioning, and then to decoding, the partitioning of the reference block being performed a plurality of times until a determined level of partitioning depth is obtained.

Such a coding device is noteworthy in that it comprises:
- first means for partitioning the current block which are adapted for partitioning the latter a plurality of times until a level of partitioning depth dependent on the level of partitioning of the reference block is obtained,
- second means for partitioning the current block which are adapted for partitioning the latter on the basis of a level of partitioning depth for the current block having been previously initialized by a level of partitioning depth dependent on the level of partitioning depth for the reference block, the first and second partitioning means being activated selectively as a function of the type of the first and second image components.

According to one particular embodiment, the first partitioning means are activated when the first image component is a depth image and the second image component is a texture image associated with the depth image, the current block and the reference block having identical positions in the first image component and in the second image component, respectively.

According to another particular embodiment, the second partitioning means are activated when the first image component is a texture image and the second image component is a depth image associated with the texture image, the current block and the reference block having identical positions in the first image component and in the second image component, respectively.

The invention further relates to a computer program comprising instructions for implementing the coding method according to the invention when it is executed on a computer.

This program can use any programming language and be in the form of source code, object code or of code intermediate between source code and object code, such as in a partially compiled form, or in any other desirable form.

The invention is also aimed at a recording medium which can be read by a computer on which is recorded a computer program, this program comprising instructions suitable for the implementation of the coding method according to the invention, such as described hereinabove.

The information medium can be any entity or device capable of storing the program. For example, the medium can comprise a storage means, such as a ROM, for example a CD ROM or a microelectronic circuit ROM, or else a magnetic recording means, for example a USB key or a hard disk.

Moreover, the information medium can be a transmissible medium such as an electrical or optical signal, which can be conveyed via an electrical or optical cable, by radio or by other means. The program according to the invention can in particular be uploaded to a network of Internet type.

Alternatively, the information medium can be an integrated circuit into which the program is incorporated, the circuit being adapted to execute or to be used in the execution of the method in question.

The aforementioned coding device and corresponding computer program exhibit at least the same advantages as those conferred by the coding method according to the present invention.

BRIEF DESCRIPTION OF THE DRAWINGS

Other characteristics and advantages will become apparent on reading preferred embodiments described with reference to the figures, in which.

DETAILED DESCRIPTION OF THE CODING METHOD OF THE INVENTION

Figure 2:
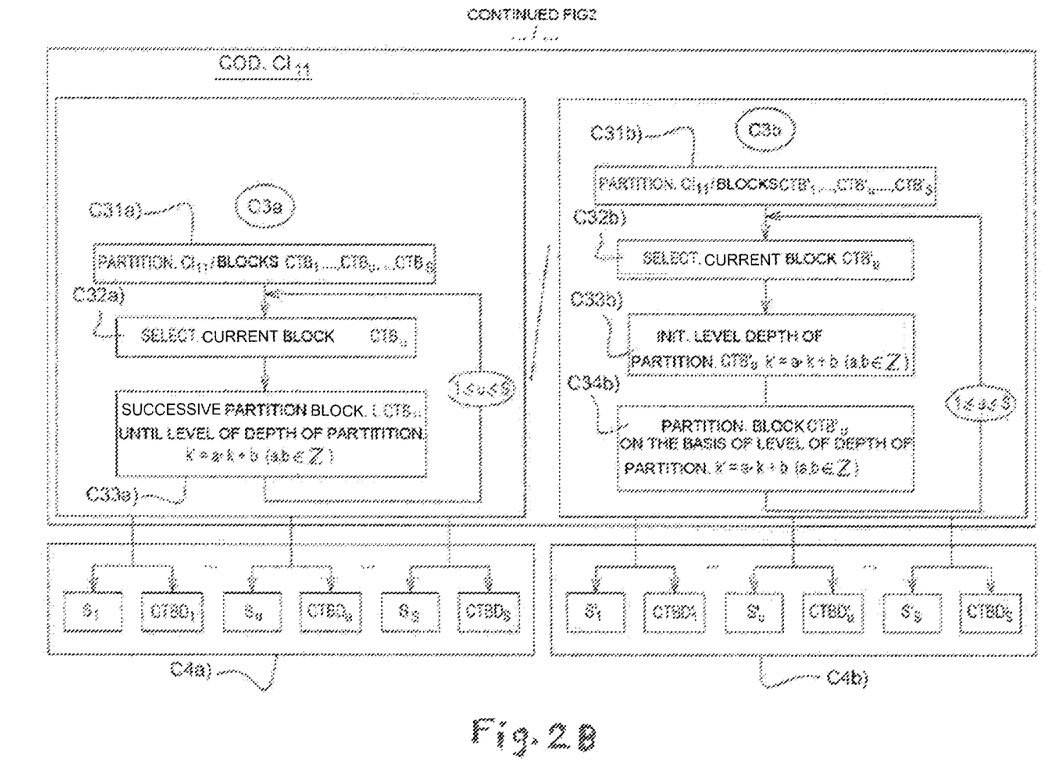
FIGS. 2A and 2B show steps of the coding method according to the invention.
Figure 2A:
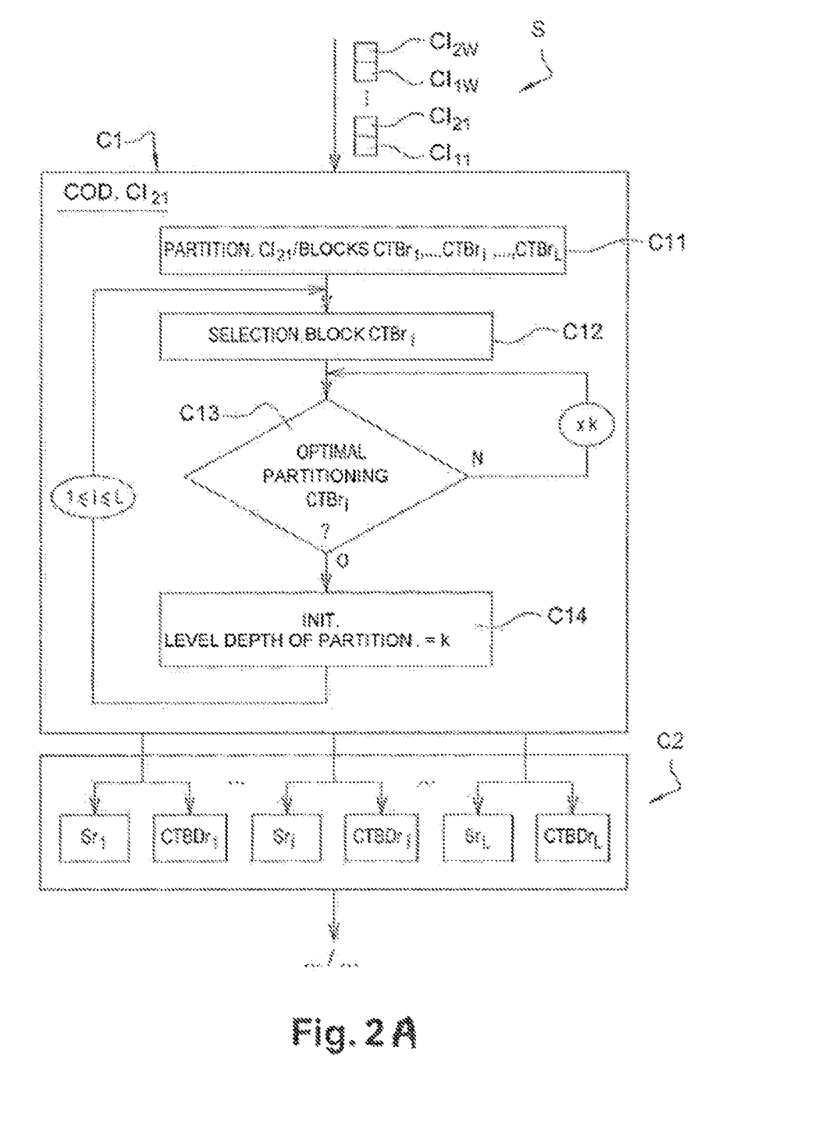

An embodiment of the invention will now be described in which the coding method according to the invention is used to code a sequence of images according to a binary stream close to that which is obtained by coding according to the 3D HEVC standard which is being drafted. In this embodiment, the coding method according to the invention is for example implemented using software or hardware by means of modifications to a coder initially compliant with the 3D HEVC standard. The coding method according to the invention is represented in the form of an algorithm comprising steps C1 to C4a) or else C1 to C4b) such as are shown in FIGS. 2A and 2B.

Figure 3:
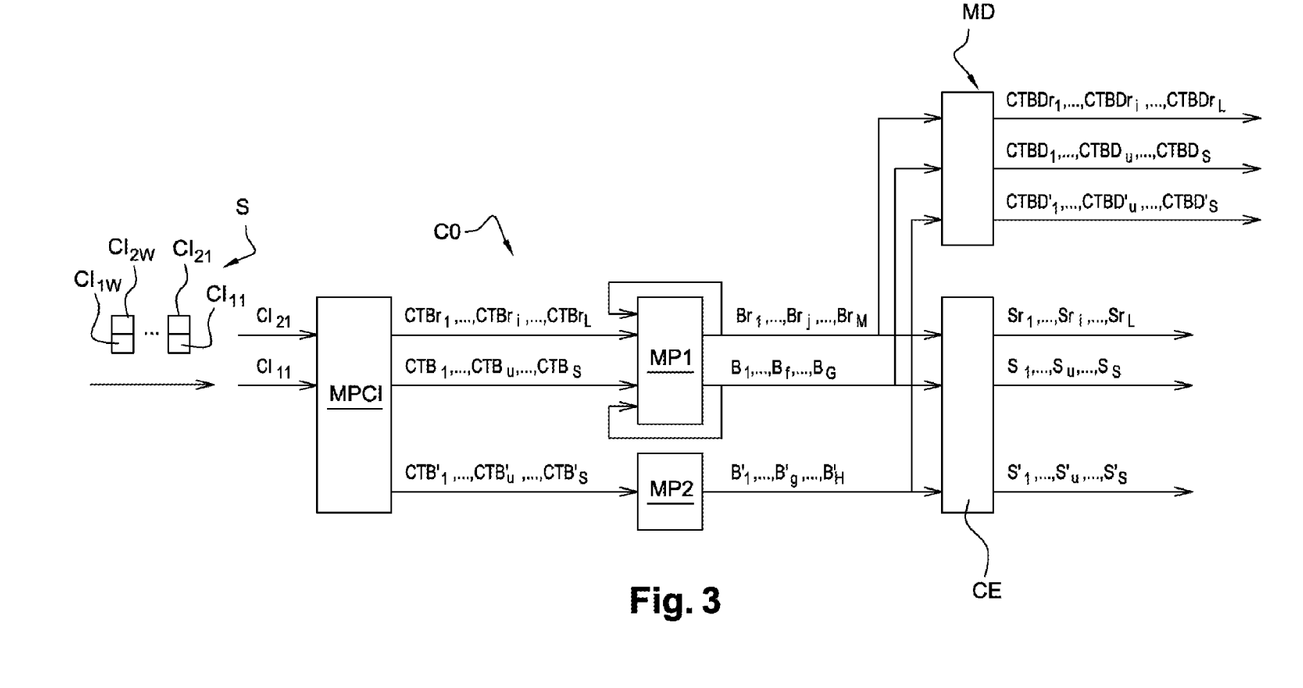
FIG. 3 shows an embodiment of a coding device according to the invention.

According to the embodiment of the invention, the coding method according to the invention is implemented in a coding device CO shown in FIG. 3.

As explained above in the description, with reference to FIGS. 2 and 3, the coding method according to the invention consists more particularly in coding a first image component $CI_{11}$, which is the current component of a sequence S of images $(CI_{11}, CI_{21}), \ldots, (CI_{1W}, CI_{2W})$ to be coded, with respect to at least one second image component $CI_{21}$, which is a reference image component of the sequence of images to be coded, that is to say which has previously been coded, and then decoded. The first image component $CI_{11}$ is acquired in association with the second image component $CI_{21}$, the first and second image components being representative of one and the same scene.

In the case where the image component $CI_{21}$ which has just been coded is a texture image and the image component $CI_{11}$ to be coded which is associated with the image component $CI_{21}$ is a depth image, in a manner known per se, the components $CI_{21}, \ldots, CI_{2W}$ of the sequence S are first coded and then decoded. Next, the components $CI_{11}, \ldots, CI_{1W}$ of the sequence S are coded one after another in their turn.

In the case of other types of components, such as the various SVC layers or the YUV components, the action involves, in a manner known per se, the coding/decoding of the component $CI_{21}$, and then the coding of the component $CI_{11}$ with reference to the component $CI_{21}$, and so on and so forth up until the coding/decoding of the component $CI_{2W}$, and then the coding of the component $CI_{1W}$ with reference to the component $CI_{2W}$.

In the course of a step CI shown in FIG. 2A, the action involves, in a manner known per se, coding by partitioning of the image component $CI_{21}$.

In the course of a sub-step C11 shown in FIG. 2A, the image component $CI_{21}$ is partitioned into a plurality of blocks $CTBr_1, CTBr_2, \ldots, CTBr_i, \ldots, CTBr_L$ of size 64×64 pixels ($1 \leq i \leq L$). Such partitioning is performed by a partitioning software module MPCI shown in FIG. 3.

It should be noted that, within the meaning of the invention, the term "block" signifies coding unit. The latter terminology is in particular used in the HEVC standard, for example in the document "B. Bross, W.-J. Han, J.-R. Ohm, G. J. Sullivan, and T. Wiegand, "High efficiency video coding (HEVC) text specification draft 6," document JCTVC-H1003 of JCT-VC, San Jose Calif., USA, February 2012".

In particular, such a coding unit groups together sets of pixels of rectangular or square shape, also called blocks, macroblocks, or else sets of pixels exhibiting other geometric shapes.

In the course of a sub-step C12 shown in FIG. 2A, a block $CTBr_i$ of the image component $CI_{21}$ is selected.

In the course of a sub-step C13 shown in FIG. 2A, the block $CTBr_i$ selected is partitioned into a plurality of coding blocks $Br_1, Br_2, \ldots, Br_j, \ldots, Br_M$ with $1 \leq j \leq M$.

The aforementioned partitioning is adapted for being performed a plurality of times until a determined level k ($k \geq 0$) of partitioning depth is obtained, for which the final partitioning obtained for the selected block $CTBr_i$ optimizes a coding performance criterion, for example, in particular the rate/distortion cost.

Said partitioning is implemented by a partitioning software module MP1 shown in FIG. 3.

In the course of a sub-step C14 shown in FIG. 2A, the level of partitioning depth for the selected block $CTBr_i$ is initialized to the value k.

Steps C12 to C14 are repeated for the set of blocks $CTBr_1, CTBr_2, \ldots, CTBr_L$.

Figure 4A:
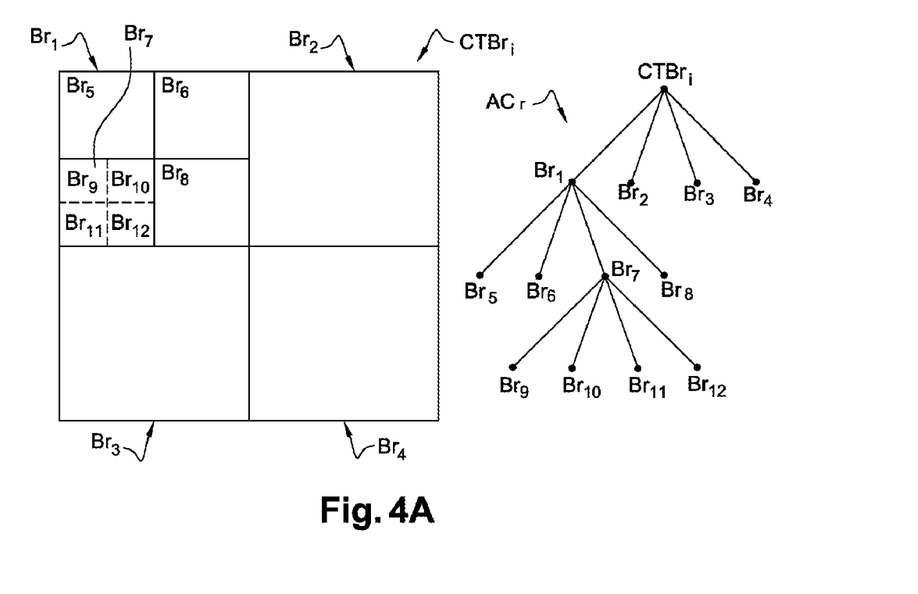
FIG. 4A shows an exemplary partitioning of a reference block of an already coded and then decoded image component, as well as the tree representative of the partitioning performed.

An exemplary partitioning of the block $CTBr_i$ is shown in FIG. 4A.

In the example shown, the partitioning performed complies with a tree of "quadtree" type, such as described above in the description and in which the level of partitioning depth k is initialized to 3.

Other types of tree can of course be envisaged.

With reference to FIG. 4A, for a given block $CTBr_i$, this block is considered to constitute the root of a coding tree ACr in which:
- a first level of leaves under the root corresponds to a first level of partitioning depth for the block $CTBr_i$ for which the block $CTBr_i$ has been partitioned a first time into a plurality of coding blocks, for example 4 coding blocks $Br_1, Br_2, Br_3, Br_4$,
- a second level of leaves under the first level of leaves corresponds to a second level of partitioning depth for the block $CTBr_i$ for which the block $CTBr_i$ partitioned a first time is partitioned a second time into a plurality of coding blocks, for example 4 coding blocks $Br_5, Br_6, Br_7, Br_8$ arising from the partitioning of the block $Br_1$,
- a third level of leaves under the second level of leaves corresponds to a third level of partitioning depth for the block $CTBr_i$ for which the block $CTBr_i$ partitioned a second time is partitioned a third time into a plurality of coding blocks, for example 4 coding blocks $Br_9, Br_{10}, Br_{11}, Br_{12}$ arising from the partitioning of the block $Br_7$.

In the course of a step C2 shown in FIG. 2A, the action involves the production of L sequences of bits $Sr_1, Sr_2, \ldots, Sr_i, \ldots, Sr_L$ which are representative of the partitionings performed on the blocks $CTBr_1, CTBr_2, \ldots, CTBr_i, \ldots, CTBr_L$, respectively. The action also involves the production of a decoded version of the blocks $CTBr_1, CTBr_2, \ldots, CTBr_i, \ldots, CTBr_L$, which are denoted $CTBDr_1, CTBDr_2, \ldots, CTBDr_i, \ldots, CTBDr_L$ in FIGS. 2 and 3. Such decoded blocks are intended to be reused by the coder CO to code a subsequent image component, such as in particular the component $CI_{11}$.

Such a step of producing binary sequences is implemented by an entropy coder CE shown in FIG. 3.

The aforementioned decoding step is for its part implemented by a decoding module MD also shown in FIG. 3.

With reference to FIG. 2B, in accordance with the invention, as a function of the type of the first and second image components $CI_{11}$ and $CI_{21}$, two alternatives C3a) and C3b) for coding by partitioning are envisaged.

In the case for example where the image component $CI_{21}$ which has just been coded is a texture image and the image component $CI_{11}$ to be coded which is associated with the image component $CI_{21}$ is a depth image, the coding alternative C3a) below is selected.

In the course of a sub-step C31a) shown in FIG. 2B, the image component $CI_{11}$ is partitioned into a plurality of blocks $CTB_1, CTB_2, \ldots, CTB_u, \ldots, CTB_S$ of size 64×64 pixels ($1 \leq u \leq S$). Such a partitioning step is implemented by the partitioning module MPCI shown in FIG. 3.

In the course of a sub-step C32a) shown in FIG. 2B, a block $CTB_u$ of the image component $CI_{11}$ is selected as current block to be coded with respect to at least one coded and then decoded reference block chosen from among the blocks $CTBr_1, CTBr_2, \ldots, CTBr_i, \ldots, CTBr_L$ of the previously coded and then decoded image component $CI_{21}$. In the description that follows, the reference block chosen is for example deemed to be the block $CTBr_i$, the current block $CTB_u$ and the reference block $CTBr_i$ having identical positions in the first image component $CI_{11}$ and in the second image component $CI_{21}$, respectively.

In the course of a sub-step C33a) shown in FIG. 2B, the selected block $CTB_u$ is partitioned into a plurality of coding blocks $B_1, B_2, \ldots, B_f, \ldots, B_G$ with $1 \leq f \leq G$.

In accordance with the invention, the partitioning of the block $CTB_u$ is performed a plurality of times until a level k' (k'≥0) which depends on the level of partitioning depth k for the reference block $CTBr_i$ is obtained.

Such a dependency relation is expressed by the equation k'=a*k+b, where a and b are relative integers which are predetermined at the coder.

Such a dependency relation thus allows the coding to avoid repartitioning the block $CTB_u$ an overly large number of times, this being expensive in terms of complexity, while succeeding in obtaining partitioning for the block $CTB_u$ which remains in accordance with a coding performance criterion, such as for example the rate/distortion cost.

Said partitioning is implemented by said first partitioning software module MP1 shown in FIG. 3.

Steps C32a) to C33a) are repeated for the whole set of blocks $CTB_1, CTB_2, \ldots, CTB_S$.

Figure 4B:
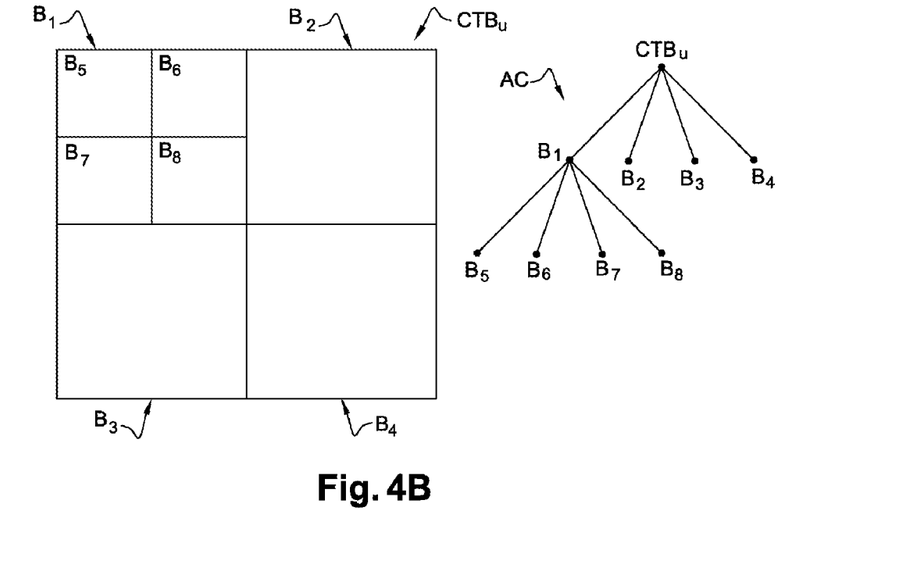
FIG. 4B shows an exemplary partitioning of a current block of an image component to be coded with respect to the partitioning of the reference block shown in FIG. 4A, as well as the tree representative of the partitioning performed.

An exemplary partitioning of the block $CTB_u$ is shown in FIG. 4B.

In the example shown, the partitioning of the current block $CTB_u$ is performed at a depth level k'=2, which is lower than the level of partitioning depth k for the reference block $CTBr_i$. For this purpose, in the relation k'=a*k+b, a and b are fixed beforehand at the coder in the following manner: a=1 and b=−1.

Of course, according to the coding context envisaged, such as for example the content of the image components $CI_{11}$ and $CI_{21}$, the level of partitioning depth k' may be lower than or higher than the level of partitioning depth k by more than one level of partitioning depth. The dependency relation k'=a*k+b is particularly advantageous in this sense since it permits a certain flexibility of adaptation for the level of partitioning depth k' according to the situations encountered during coding.

With reference to FIG. 4B, for a given current block $CTB_u$, this block is considered to constitute the root of a coding tree AC in which:
- a first level of leaves under the root corresponds to a first level of partitioning depth for the block $CTB_u$ for which the block $CTB_u$ has been partitioned a first time into a plurality of coding blocks, for example 4 coding blocks $B_1, B_2, B_3, B_4$,
- a second level of leaves under the first level of leaves corresponds to a second level of partitioning depth for the block $CTB_u$ for which the block $CTB_u$ partitioned a first time is partitioned a second time into a plurality of coding blocks, for example 4 coding blocks $B_5, B_6, B_7, B_8$ arising from the partitioning of the block $B_1$.

In the example shown, the block $B_7$ has therefore not been repartitioned into 4 blocks like the block $Br_7$ of the reference block $CTBr_i$.

In the course of a step C4a) shown in FIG. 2B, the action involves the production of S sequences of bits $S_1, S_2, \ldots, S_u, \ldots, S_S$ which are representative of the partitionings performed on the blocks $CTB_1, CTB_2, \ldots, CTB_u, \ldots, CTB_S$, respectively. The action also involves the production of a decoded version of the blocks $CTB_1, CTB_2, \ldots, CTB_u, \ldots, CTB_S$, which are denoted $CTBD_1, CTBD_2, \ldots, CTBD_u, \ldots, CTBD_S$ in FIG. 2B. Such decoded blocks are intended to be reused by the coder CO to code a subsequent image component.

Such a step of producing binary sequences is implemented by the entropy coder CE shown in FIG. 3.

The aforementioned decoding step is for its part implemented by the decoding module MD also shown in FIG. 3.

The second alternative C3b) for coding by partitioning which is envisaged in accordance with the invention will now be described with reference to FIG. 2B.

Such an alternative is envisaged in the case for example where the image component $CI_{21}$ which has just been coded is a depth image and the image component $CI_{11}$ to be coded which is associated with the image component $CI_{21}$ is a texture image.

In the course of a sub-step C31b) shown in FIG. 2B, the image component $CI_{11}$ is partitioned into a plurality of blocks $CTB'_1, CTB'_2, \ldots, CTB'_u, \ldots, CTB'_S$ of size 64×64 pixels (1≤u≤S). Such a partitioning step is implemented by the partitioning module MPCI shown in FIG. 3.

In the course of a sub-step C32b) shown in FIG. 2B, a block $CTB'_u$ of the image component $CI_{11}$ is selected as current block to be coded with respect to at least one coded and then decoded reference block chosen from among the blocks $CTBr_1, CTBr_2, \ldots, CTBr_i, \ldots, CTBr_L$ of the previously coded image component $CI_{21}$. In the description that follows, the reference block chosen is for example deemed to be the block $CTBr_i$, the current block $CTB'_u$ and the reference block $CTBr_i$ having identical positions in the first image component $CI_{11}$ and in the second image component $CI_{21}$, respectively.

In the course of a sub-step C33b) shown in FIG. 2B, the action involves the initialization of the level of partitioning depth for the block $CTB'_u$, on the basis of the level of partitioning depth k'=a*k+b.

For this purpose, in the course of a step C34b) shown in FIG. 2B, the block $CTB'_u$ is partitioned directly into a plurality of coding blocks $B'_1, B'_2, \ldots, B'_g, \ldots, B'_H$ with 1≤g≤H, on the basis of the previously initialized level of partitioning depth k'. Intermediate steps of partitioning of the block $CTB'_u$ are thus avoided, thereby noticeably reducing the complexity in terms of calculations during coding.

Subsequent to the step C34b) of partitioning of the block $CTB'_u$, the latter can be partitioned again a plurality of times until a predetermined level of partitioning depth is obtained at the coder.

Said partitioning is implemented by a second partitioning software module MP2 shown in FIG. 3.

Steps C32b) to C34b) are repeated for the whole set of blocks $CTB'_1, CTB'_2, \ldots, CTB'_S$.

Figure 4C:
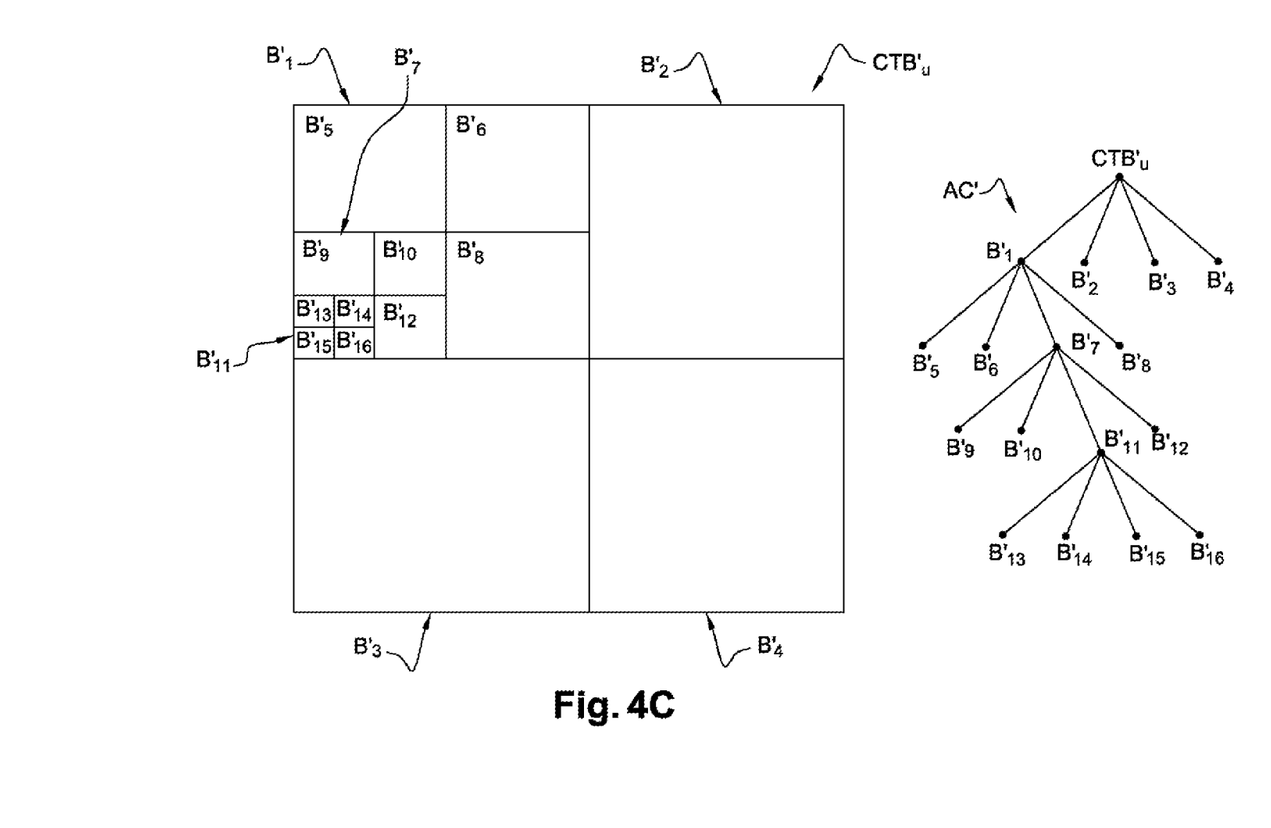
FIG. 4C shows another exemplary partitioning of a current block of an image component to be coded with respect to the partitioning of the reference block shown in FIG. 4A, as well as the tree representative of the partitioning performed.

An exemplary partitioning of the block $CTB'_u$ is shown in FIG. 4C.

In this example, the reference block $CTBr_i$ used to code the current block $CTB'_u$ is deemed to be that which has been partitioned as shown in FIG. 4A.

In the example shown in FIG. 4C, the partitioning of the current block $CTB'_u$ is performed on the basis of a depth level k'=4, which is higher than the level of partitioning depth k for the reference block $CTBr_i$. For this purpose, in the relation k'=a*k+b, a and b are fixed beforehand at the coder in the following manner: a=1 and b=1. As has been explained in the description above, other choices of level of partitioning depth k' are possible according to the video context. In particular, the level of partitioning depth k' can be lower than or higher than the level of partitioning depth k by more than one level of partitioning depth.

With reference to FIG. 4C, for a given current block $CTB'_u$, this block is considered to constitute the root of a coding tree AC' in which:

a first level of leaves under the root corresponds to a first level of partitioning depth for the block $CTB'_u$ for which the block $CTB'_u$ has been partitioned a first time into a plurality of coding blocks, for example 4 coding blocks $B'_1, B'_2, B'_3, B'_4$, a second level of leaves under the first level of leaves corresponds to a second level of partitioning depth for the block $CTB'_u$ for which the block $CTB'_u$ partitioned a first time is partitioned a second time into a plurality of coding blocks, for example 4 coding blocks $B'_5, B'_6, B'_7, B'_8$ arising from the partitioning of the block $B'_1$, a third level of leaves under the second level of leaves corresponds to a third level of partitioning depth for the block $CTB'_u$ for which the block $CTB'_u$ partitioned a second time is partitioned a third time into a plurality of coding blocks, for example 4 coding blocks $B'_9, B'_{10}, B'_{11}, B'_{12}$ arising from the partitioning of the block $B'_7$, a fourth level of leaves under the third level of leaves corresponds to a fourth level of partitioning depth for the block $CTB'_u$ for which the block $CTB'_u$ partitioned a third time is partitioned a fourth time into a plurality of coding blocks, for example 4 coding blocks $B'_{13}, B'_{14}, B'_{15}, B'_{16}$ arising from the partitioning of the block $B'_{11}$.

In the example shown, the block $B'_{11}$ has therefore been partitioned into 4 blocks in contrast with the block $Br_{1i}$ of the reference block $CTBr_i$.

In the course of a step C4b) shown in FIG. 2B, the action involves the production of S sequences of bits $S'_1, S'_u, \ldots, S'_S$ which are representative of the partitionings performed on the blocks $CTB'_1, CTB'_2, \ldots, CTB'_u, \ldots, CTB'_S$, respectively. The action also involves the production of a decoded version of the blocks $CTB'_1, CTB'_2, \ldots, CTB'_u, \ldots, CTB'_S$, which are denoted $CTBD'_1, CTBD'_2, \ldots, CTBD'_u, \ldots, CTBD'_S$ in FIG. 2B. Such decoded blocks are intended to be reused by the coder CO to code a subsequent image component.

Such a step of producing binary sequences is implemented by the entropy coder CE shown in FIG. 3.

The aforementioned decoding step is for its part implemented by the decoding module MD also shown in FIG. 3.

It goes without saying that the embodiments which have been described hereinabove have been given purely by way of wholly non-limiting indication, and that numerous modifications can be easily introduced by the person skilled in the art without, however, departing from the scope of the invention.

The invention claimed is:

1. A method comprising:
coding at least one current block of a first image component with respect to a reference block of at least one second image component, said first and second image components being representative of one and the same scene, said reference block having previously been subjected to coding by partitioning, and then to decoding, said partitioning of the reference block being performed a plurality of times until a determined level (k) (k≥0) of partitioning depth is obtained, said method comprising, before said coding, as a function of the type of the first and second image components:
  either partitioning by a coding device the current block to be coded a plurality of times until a level of partitioning depth (k') dependent on the level of partitioning (k) of the reference block is obtained, by using a dependency relation that is predetermined,
  or partitioning by the coding device the current block to be coded on the basis of a level of partitioning depth having been previously initialized by a level of partitioning depth (k') which depends on the level of partitioning depth (k) for the reference block by using a dependency relation that is predetermined,
wherein partitioning the current block, a plurality of times, is implemented when the first image component is a depth image and the second image component is a texture image associated with said depth image, the current block and the reference block having identical positions in the first image component and in the second image component, respectively.

2. The coding method as claimed in claim 1, in which partitioning the current block on the basis of a previously initialized level of partitioning depth is implemented when the first image component is a texture image and the second image component is a depth image associated with said texture image, the current block and the reference block having identical positions in the first image component and in the second image component, respectively.

3. A device for coding at least one current block of a first image component with respect to a reference block of at least one second image component, said first and second image components being representative of one and the same scene, said reference block having previously been subjected to coding by partitioning, and then to decoding, said partitioning of the reference block being performed a plurality of times until a determined level (k) (k≥0) of partitioning depth is obtained, said device comprising:
  first means for partitioning the current block to be coded which are adapted for partitioning the latter a plurality of times until a level of partitioning depth (k') dependent on the level of partitioning (k) of the reference block is obtained, by using a dependency relation that is predetermined,
  second means for partitioning the current block to be coded which are adapted for partitioning the latter on the basis of a level of partitioning depth for the current block having been previously initialized by a level of partitioning depth (k') dependent on the level of partitioning depth (k) of the reference block, by using a dependency relation that is predetermined,
said first and second partitioning means being activated before the coding of said at least one current block, selectively as a function of the type of the first and second image components, and
wherein said first partitioning means are activated when the first image component is a depth image and the second image component is a texture image associated with said depth image, the current block and the reference block having identical positions in the first image component and in the second image component, respectively.

4. The coding device as claimed in claim 3, in which said second partitioning means are activated when the first image component is a texture image and the second image component is a depth image associated with said texture image, the current block and the reference block having identical positions in the first image component and in the second image component, respectively.

5. A non-transitory recording medium which can be read by a computer on which is recorded a computer program comprising instructions for execution of a method of coding method for coding at least one current block of a first image component, when this program is executed by a processor, wherein the method comprises:
  coding the at least one current block of the first image component with respect to a reference block of at least one second image component, said first and second image components being representative of one and the same scene, said reference block having previously been subjected to coding by partitioning, and then to decoding, said partitioning of the reference block being performed a plurality of times until a determined level (k) (k≥0) of partitioning depth is obtained, said method comprising, before said coding, as a function of the type of the first and second image components:

either partitioning by a coding device the current block to be coded a plurality of times until a level of partitioning depth (k') dependent on the level of partitioning (k) of the reference block is obtained, by using a dependency relation that is predetermined, or partitioning by the coding device the current block to be coded on the basis of a level of partitioning depth having been previously initialized by a level of partitioning depth (k') which depends on the level of partitioning depth (k) for the reference block by using a dependency relation that is predetermined, wherein partitioning the current block, a plurality of times, is implemented when the first image component is a depth image and the second image component is a texture image associated with said depth image, the current block and the reference block having identical positions in the first image component and in the second image component, respectively.

6. An apparatus comprising: a non-transitory computer-readable storage medium; and a data sequence stored on the storage medium and representative of a partitioning of at least one current block of a first image component which has been coded with respect to a reference block of at least one second image component, said first and second image components being representative of one and the same scene, said reference block having previously been subjected to coding by partitioning, and then to decoding, said partitioning of the reference block being performed a plurality of times until a determined level (k) (k≥0) of depth of partitioning is obtained, wherein said data sequence is representative, before coding of said at least one current block, as a function of the type of the first and second image components:

either of the partitioning of the current block to be coded a plurality of times until a level of depth of partitioning (k') dependent on the level of partitioning (k) of the reference block is obtained, by using a dependency relation that is predetermined, or of the partitioning of the current block to be coded on the basis of a level of depth of partitioning having been previously initialized by a level of depth of partitioning (k') which depends on the level of depth of partitioning (k) for the reference block by using a dependency relation that is predetermined, wherein in the case where said data sequence is representative of partitioning the current block a plurality of times, the first image component is a depth image and the second image component is a texture image associated with said depth image, the current block and the reference block having identical positions in the first image component and in the second image component, respectively.

* * * * *